(12) United States Patent
Evesti et al.

(10) Patent No.: US 11,445,371 B2
(45) Date of Patent: Sep. 13, 2022

(54) METHOD AND APPARATUS FOR GRANTING ACCESS RIGHTS TO USERS OF COMMUNICATIONS NETWORKS

(71) Applicant: PCMS Holdings, Inc., Wilmington, DE (US)

(72) Inventors: Antti V. P. Evesti, Oulu (FI); Pia E. Raitio, Oulu (FI); Pekka P. Savolainen, Oulu (FI)

(73) Assignee: PCMS Holdings, Inc., Wilmington, DE (US)

( * ) Notice: Subject to any disclaimer, the term of this patent is extended or adjusted under 35 U.S.C. 154(b) by 708 days.

(21) Appl. No.: 15/756,003

(22) PCT Filed: Aug. 17, 2016

(86) PCT No.: PCT/US2016/047363
§ 371 (c)(1),
(2) Date: Feb. 27, 2018

(87) PCT Pub. No.: WO2017/040046
PCT Pub. Date: Mar. 9, 2017

(65) Prior Publication Data
US 2018/0343252 A1 Nov. 29, 2018

Related U.S. Application Data

(60) Provisional application No. 62/211,032, filed on Aug. 28, 2015.

(51) Int. Cl.
*H04L 29/06* (2006.01)
*H04W 12/08* (2021.01)
(Continued)

(52) U.S. Cl.
CPC ......... *H04W 12/08* (2013.01); *H04L 63/0876* (2013.01); *H04L 63/10* (2013.01);
(Continued)

(58) Field of Classification Search
CPC ..... H04L 63/0876; H04L 63/10; H04L 67/12; H04W 4/70; H04W 8/24; H04W 12/08; H04W 48/16
(Continued)

(56) References Cited

U.S. PATENT DOCUMENTS 7,260,597 B1    8/2007  Hofrichter
8,479,266 B1 *  7/2013  Delker ............... H04L 63/0272
                                                          726/4

(Continued)

OTHER PUBLICATIONS

Al-Fuqaha, "Internet of Things: A Survey on Enabling Technologies, Protocols, and Applications", 2015, IEEE, pp. 2347-2376 (Year: 2015).*

(Continued)

*Primary Examiner* — Taghi T Arani
*Assistant Examiner* — Gregory A Lane
(74) *Attorney, Agent, or Firm* — Invention Mine LLC

(57) ABSTRACT

Methods, apparatus, and systems for automatically determining the access rights to be granted to a telecommunication device to the assets in a first network as a function of the access rights previously granted to that same device in another network.

20 Claims, 11 Drawing Sheets

| Device | Category | Sensitivity | Criticality |
|---|---|---|---|
| - (Default) | Entertainment | Low | Low |
| TV | Entertainment | Low | Low |
| Audio | Entertainment | Low | Low |
| Content storage | Entertainment | Medium | Low |
| - (Default) | Home automation | Low | Medium |
| Thermostat | Home automation | Low | Medium |
| Temperature sensor | Home automation | Low | Low |
| Air conditioner | Home automation | Low | Medium |
| Lights | Home automation | Low | Low |
| - (Default) | Healthcare | High | Medium |
| Data from heart rate monitor | Healthcare | Medium | Low |
| - (Default) | Security | High | High |
| Alarms system | Security | High | High |
| Locks | Security | Medium | High |

(51) Int. Cl.
*H04W 4/70* (2018.01)
*H04L 67/12* (2022.01)
*H04L 9/40* (2022.01)
*H04W 8/24* (2009.01)
*H04W 48/16* (2009.01)
*H04W 60/00* (2009.01)
*H04W 88/06* (2009.01)

(52) U.S. Cl.
CPC .............. *H04L 67/12* (2013.01); *H04W 4/70* (2018.02); *H04W 8/24* (2013.01); *H04W 48/16* (2013.01); *H04W 60/005* (2013.01); *H04W 88/06* (2013.01)

(58) Field of Classification Search
USPC .................................................... 726/4
See application file for complete search history.

(56) References Cited

U.S. PATENT DOCUMENTS

| | | | |
|---|---|---|---|
| 8,903,979 B2 | 12/2014 | Kim | |
| 9,083,566 B1 | 7/2015 | Pearson | |
| 9,213,995 B1* | 12/2015 | Rao | G06Q 50/01 |
| 2004/0177072 A1 | 9/2004 | Salminen | |
| 2005/0222933 A1* | 10/2005 | Wesby | H04L 67/10 |
| | | | 705/36 R |
| 2007/0211675 A1* | 9/2007 | Jain | H04W 88/06 |
| | | | 370/338 |
| 2008/0031192 A1* | 2/2008 | Narashimha | H04W 12/068 |
| | | | 370/331 |
| 2009/0193503 A1* | 7/2009 | Shevehenko | H04L 63/0272 |
| | | | 726/4 |
| 2010/0115113 A1* | 5/2010 | Short | G06Q 50/163 |
| | | | 709/228 |
| 2010/0197272 A1 | 8/2010 | Karaoguz | |
| 2012/0083241 A1* | 4/2012 | Annamalai | H04W 64/00 |
| | | | 455/404.2 |
| 2012/0117615 A1 | 5/2012 | Mackinnon | |
| 2012/0264402 A1* | 10/2012 | Zhang | H04W 12/069 |
| | | | 455/411 |
| 2013/0318572 A1* | 11/2013 | Singh | H04W 12/08 |
| | | | 726/4 |
| 2015/0249651 A1* | 9/2015 | Okamoto | H04L 63/08 |
| | | | 713/171 |
| 2016/0072806 A1* | 3/2016 | Kim | H04L 41/0806 |
| | | | 726/5 |
| 2016/0127175 A1* | 5/2016 | Sanderson | H04L 41/0806 |
| | | | 370/252 |

OTHER PUBLICATIONS

3rd Generation Partnership Project; Technical Specification Group Services and System Aspects; IP Multimedia Subsystem (IMS); Stage 2 (Release 10), 3GPP Standard; 3GPP TS 23.228, 3rd Generation Partnership Project (3GPP), vol. SA WG2, No. V10.6.0, Sep. 2011, 272 pages.

International Search Report and Written Opinion of the International Searching Authority for PCT/US2016/047363 dated Nov. 11, 2016.

International Preliminary Report on Patentability PCT/US2016/047363 dated Sep. 7, 2017.

Corrected International Preliminary Report on Patentability PCT/US2016/047363 dated Nov. 30, 2017.

* cited by examiner

| Device | | Category | Sensitivity | Criticality |
|---|---|---|---|---|
| - | (Default) | Entertainment | Low | Low |
| TV | | Entertainment | Low | Low |
| Audio | | Entertainment | Low | Low |
| Content storage | | Entertainment | Medium | Low |
| - | (Default) | Home automation | Low | Medium |
| Thermostat | | Home automation | Low | Medium |
| Temperature sensor | | Home automation | Low | Low |
| Air conditioner | | Home automation | Low | Medium |
| Lights | | Home automation | Low | Low |
| - | (Default) | Healthcare | High | Medium |
| Data from heart rate monitor | | Healthcare | Medium | Low |
| - | (Default) | Security | High | High |
| Alarms system | | Security | High | High |
| Locks | | Security | Medium | High |

METHOD AND APPARATUS FOR GRANTING ACCESS RIGHTS TO USERS OF COMMUNICATIONS NETWORKS

The present application is a national stage application under 35 U.S.C. 371 of International Application No. PCT/US2016/047363, entitled METHOD AND APPARATUS FOR GRANTING ACCESS RIGHTS TO USERS OF COMMUNICATIONS NETWORKS, filed on Aug. 17, 2016, which claims benefit under 35 U.S.C. § 119(e) from U.S. Provisional Patent Application Ser. No. 62/211,032, entitled "Method And Apparatus For Granting Access Rights To Users Of Communications Networks", filed Aug. 28, 2015.

FIELD

The present disclosure relates to access rights to networks, particularly wireless networks and Smart Spaces.

BACKGROUND

Home, office, and other local area networks, particularly wireless networks, are becoming increasingly ubiquitous and sophisticated. Such networks may be populated with a multiplicity of electronic devices interconnected through the network. Such devices may include smart phones, computers, printers, smart televisions and other video equipment, smart appliances, thermostats, security systems, stereos and other audio equipment, etc. The term "Smart Space" has been coined for networks (or portions thereof) in which a plurality of electronic devices utilize a shared view of resources and services so that, for instance, the user interface of one device in the Smart Space may be used to interface with other devices in the Smart Space. Merely as an example, a smart refrigerator with wireless communication capabilities and an electronic user interface (e.g., a display such as a touch screen on the refrigerator door) may be used to control other electronic devices in the Smart Space, e.g., a stereo. Thus, for instance, the smart refrigerator may have a digital interface on which a user may control the refrigerator, such as by setting the temperatures in the freezer and refrigerator compartments, controlling the refrigerator door dispenser to selectively dispense ice cubes, crushed ice, or water, etc. In addition, however, a user may be able to repurpose the user interface on the smart refrigerator so that the user can control another electronic device in the Smart Space from the user interface of the smart refrigerator. For example, a person standing at the refrigerator may wish to turn the volume up on the television, and may do so by calling up a user interface for the television on the display device of the refrigerator and controlling the television from the refrigerator through the home wireless network.

In other examples, authorized users are able to interface with the electronic devices in the Smart Space through their computers, smart phones, and other personal devices.

SUMMARY

The disclosure pertains to methods, apparatus, and systems for automatically determining the access rights granted to a telecommunication device to the assets in a first network as a function of the access rights previously granted to that same device (or another device registered to a same user) in a second network. The two networks may, for instance, be owned or operated by the same entity.

According to a first exemplary embodiment, when a first network gateway grants a telecommunication device access rights to that network, it sends an access rights profile describing those rights to a centralized database, e.g., cloud storage, so that the access rights profile may be accessed by gateways of other networks owned or operated by the same entity. Then, when that same device (or possibly a different device registered to a same user) attempts to join a second network operated by the same entity, that second network's gateway acquires the access rights profile of that device in the first network from the database and deduces a new set of access rights to be granted to the telecommunication device to the assets available in the second network based on the access rights previously granted in first network. The deduction process may include, for example, determining the similarities and differences between assets in the first network and assets in the second network in a multiplicity of categories and granting access rights to the assets in the second network that are similar to the access rights granted to similar devices in the first network.

BRIEF DESCRIPTION OF THE DRAWINGS

A more detailed understanding may be had from the detailed description below, given by way of example, in conjunction with drawings appended hereto. Figures in such drawings, like the detailed description, are examples. As such, the figures and the detailed description are not to be considered limiting, and other equally effective examples are possible and likely.

Furthermore, like reference numerals in the figures indicate like elements, and wherein:

FIG. 1 is a table illustrating exemplary devices and the asset type, sensitivity level, and criticality level that each might be assigned in accordance with principles disclosed herein.

DETAILED DESCRIPTION

Figure 2:
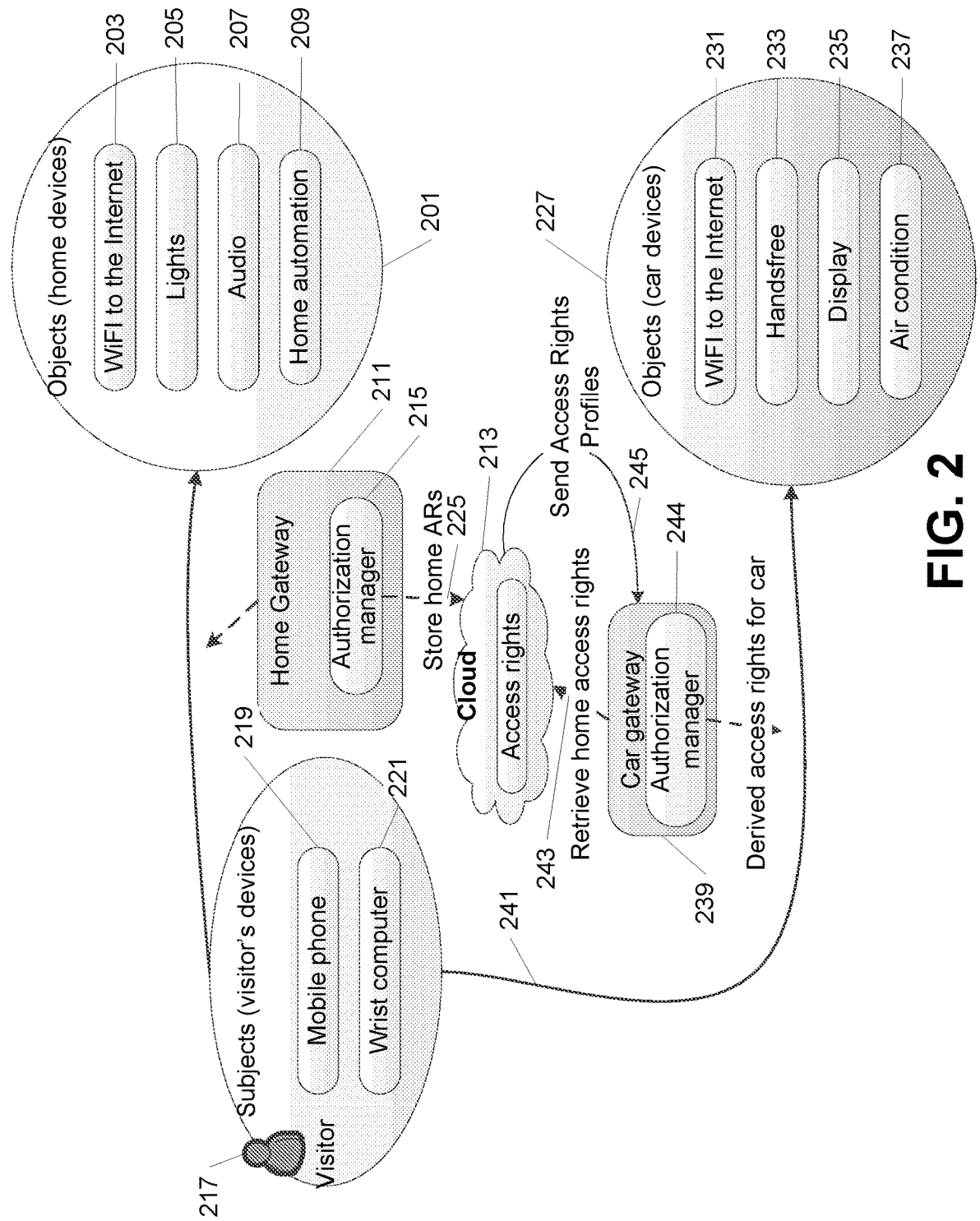
FIG. 2 is a block diagram of a system including multiple related Smart Spaces in accordance with the principles disclosed herein.

The owner, operator, or administrator (hereinafter "owner" for purposes of brevity) of a local area network (LAN), including a Smart Space, may own, operate, or administer multiple, distinct networks and/or Smart Spaces. For instance, an individual may have a first Smart Space in a primary home, a second Smart Space in a car, and a third Smart Space in a vacation home. As another example, a company may have separate local area networks, e.g., Smart Spaces, defined in different buildings, different parts of a building, or different campuses. Each of the nodes of the LAN typically will have a transmitter and a receiver for communicating via the network as well as one or more processors for performing that node's normal functions as well as the various functions disclosed herein.

Also, it may be desirable for the network owner to grant access rights to certain individuals to some or all of the services, data, and/or devices available in one or more of the owner's Smart Spaces, LANS, or other networks. These individuals may include, for example, family members, employees, visitors, friends, and/or guests.

The following discussion will primarily refer to a plurality of Smart Spaces owned by an individual homeowner. However, it should be understood that this is merely exemplary for ease of discussion and that the concepts discussed herein are applicable to other types of networks and to other types of network operators.

In one example, a homeowner may grant limited access to devices, services, data, and the like (hereinafter "assets" for brevity) available through his or her home Smart Space to a visiting friend. For instance, the homeowner may wish to give the friend access to control audio and video equipment and/or the ability to control the thermostat within a 5° range of a predetermined temperature, but not to grant access to printers, stored data, or the home security system.

Typically, the homeowner would manually enter the access rights profile for the given person into a Smart Space Manager. The Smart Space Manager would then store this data, which may be stored in the form of an identification of the guest's device (e.g., a MAC address) and/or the guest's name or other identification associated with the various granted access rights. Those access rights may then be deemed permanent (unless the owner were to manually change them) so that, if the same guest were to leave the network coverage area and then return, the Smart Space manager would recognize the MAC address (or other ID) of the device and grant the same access rights the next time the device attempted to join the Smart Space. Also, access rights could be granted to a person rather than a device so that all devices owned by the same guest would receive those same access rights. The Smart Space manager could be made aware that multiple devices that belong to the same person in any number of ways, such as by manual entry by the homeowner or use of a common password.

If that same guest/device were to enter within the coverage area of and attempt to join a second one of the homeowner's Smart Spaces (e.g., the homeowners car or vacation home), the homeowner would again have to manually enter the desired access rights for that guest/device into the Smart Space manager for that second Smart Space.

Disclosed herein are methods, apparatus, and systems for granting access rights to users of networks wherein the particular access rights granted within that network are established as a function of access rights previously granted to the same user or device in another network. The following discussion will focus on multiple Smart Spaces under ownership of a single entity. However, this is merely exemplary insofar as the technology disclosed herein could be applied to any two or networks.

In one exemplary embodiment, the access rights that have been granted to a certain user/device in one Smart Space (an access rights profile) may be stored in a database so that they can be accessed by multiple, disparate and/or geographically separated Smart Space Managers owned or operated by the same administrator. For instance, a database of access rights profiles may be stored in cloud storage accessible through the Internet. The Smart Space Managers of the individual Smart Spaces (or other type of management node of a network) of a given owner would have access (e.g., via the Internet) to the Smart Space access rights database so as to be able to (1) write such Smart Space access rights profiles data to the database when granting access rights to a device and (2) read from the database in order to obtain previous access rights profiles from which it may derive access rights to its Smart Space based, at least partially, on the access rights previously granted in other Smart Spaces (e.g., other Smart Spaces operated by the same administrator).

Note that the terms asset and Smart Space device as used herein are intended to refer not only to those devices that are traditionally thought of as Smart Space devices, such as smart appliances and televisions, but also to devices, such as mobile devices whose primary function in the Smart Space is to control other devices, including the owners, visitors, and other person's smart phones, tablets, and computers. Also, certain devices may serve double duty as both control devices as well as more traditional assets in the Smart Space. For example, a smart phone or computer may be used to control smart appliances, such as a stereo or television, but may also serve as a storage device for music, photos, and videos in the Smart Space and/or provide services to other devices within a Smart Space, such as a music, photo, and/or video player.

In the following discussion, a device or asset that is being granted access rights might sometimes be referred to as a user device/asset or controlling device/asset and the devices to which access rights are being granted may be referred to as the controlled device/asset or Smart Space device/asset for convenience. However, this is not intended to imply that there is necessarily any difference between such devices other than their immediate role in the given context. The controlling device and the controlled device could be two identical devices (e.g., two smart phones, such as a first smart phone seeking to access music stored on a second smart phone. In a broad sense, the principles of this disclosure pertain to methods, apparatus, and systems for determining access rights for a first communication device (or user) to operate or control a second communication device in a first network as a function of access rights applicable to the first device (or user) in one or more other networks.

In one exemplary embodiment, in order to assist in the derivation of access rights to Smart Space assets in one Smart Space based on access rights previously granted in other Smart Spaces, such Smart Space assets may be assigned values in each of one or more categories. These values may be used to determine similarities and differences between the assets in the new Smart Space (i.e., the Smart Space in which access rights are to be derived based on previously granted access rights in one or more other Smart Spaces) and the Smart Space assets in the old Smart Space(s) (i.e., the Smart Space(s) in which access rights were previously granted).

In one embodiment, some or all of the Smart Space assets in each of the old Smart Space and the new Smart Space may be assigned a value in each of several categories. The categories may correspond to any significant characteristic of the asset. FIG. 1 is a table illustrating some exemplary devices and categories. In this example, the values and categories are (1) an asset type in an asset type category, (2) a criticality level in a criticality category, and (3) a sensitivity level in a sensitivity category.

More particularly, each Smart Space asset may be assigned an asset type according to its utility. Example categories may include audio, video, entertainment, work/ office, utility, electric, gas, telephone, lighting, building/ home security, health care, appliance, kitchen, bath, etc.

Asset types may be hierarchical or overlap. For example, video and audio may be sub-categories of entertainment. In addition, a Smart Space asset may be classified under multiple categories (either overlapping categories or not). For instance, a television may be classified under all of video, audio, and entertainment.

The criticality category may be used to categorize a Smart Space asset according to its importance to the homeowner (e.g., the extent to which a user who has the ability to control or access that asset may be able to do something that would be harmful or otherwise significant to the owner). For instance, an alarm system in a home or a heart monitor in a hospital might be assigned a higher criticality level than a television. The criticality level may, for instance, define a criticality of a Smart Space asset from the physical world perspective, e.g., the more that a malicious modification of that asset would be able to cause damage in the physical world, the higher the criticality level that it would be assigned.

The sensitivity category may be used to categorize smart space assets according to the sensitivity of the data available through them. For instance, confidential data, such as banking records, might be assigned a higher sensitivity level than vacation photographs or music libraries.

Of course, many additional or alternate categories are possible. For instance, an alternate or additional category may be an asset classification category including potential values such as data, service, or device.

There may be default sensitivity and criticality levels assigned to asset types. For instance, as can be seen in the first row of FIG. 1, if an entertainment type of Smart Space device is found that does not match any of the more specific device types known to the Smart Space, the Smart Space may assign it a default criticality level of "medium" and a default sensitivity level of "low" based solely on its asset category.

FIG. 2 is a block diagram of the components of one exemplary system in accordance with principles disclosed herein. As shown, a first Smart Space 201, which may be a home Smart Space, comprises a number of Smart Space devices, such as a modem 202 or other device that enables communications with and through the Internet as well supports a wireless LAN that forms the communication infrastructure the Smart Space, lighting 205, an audio component 207 (such as a stereo system), and a home automation device 209 (such as a smart thermostat). The Smart Space 201 interfaces with a cloud component 213 via a home gateway 211. The cloud component 213 may be a server available through the Internet. The home gateway 211 may communicate with the cloud component via the modem 202. The home gateway 211 is the node that essentially performs the management functions of the home Smart Space 201. The home gateway 211, for instance, keeps track of the devices in the Smart Space and their properties, runs the logic that permits one Smart Space device to be used to control another Smart Space device through the home network, and performs all of the other functions typically performed by a Smart Space gateway. It includes the logic, hardware, and/or software that manages the Smart Space, including, for instance, an authorization manager 215. In addition to such conventional hardware and software, the Smart Space gateway 211 includes an authorization manager 215. The authorization manager 215 is the module that locally manages the access rights for the home Smart Space 201. Accordingly, it performs such functions as keeping track of which devices are permitted to access the Smart Space and what those permissions are, i.e., granted access rights.

The home gateway 211 may be a dedicated computing device or a software module running on a general purpose computer or any computer or processor that may also perform other functions. It may be a separate node of the Smart Space network or may be a component portion of another node of the network, e.g., any other Smart Space device. Although shown outside of the Smart Space 201 in FIG. 1, the home gateway 211 may be considered part of the Smart Space 201.

A visitor 217 to the Smart Space 201 may have one or more personal wireless telecommunication devices, such as a smart phone 219 and a wrist computer 221. As will be described in more detail further below, when the visitor's device(s) 219, 221 come within communication range of the Smart Space 201, the home gateway 211 detects the presence of the device(s) and commences an operation to determine which, if any, access rights have already been granted to them or should be granted to them. For example, if a device has previously been granted access rights in the smart space and those access rights are stored in memory at the home gateway 211, then the home gateway may permit that device to have access to the Smart Space in accordance with those access rights. If, on the other hand, for instance, the home gateway 211 has not previously seen the device, e.g., mobile phone 219, the gateway may send a message to the owner/administrator of the Smart Space asking the owner to provide a set of access rights for the device. This message to the owner (and the owner's reply message) may be sent through the Smart Space network itself, through the Internet, and/or by any other mechanism. The authorization manager 215 in the home gateway 211, will then create and store in memory at the gateway an access right profile for that device 219. Table 1 below shows an exemplary access right profile for a visitor's mobile phone 219.

TABLE 1

| User Device | Smart Space Device | Access Right |
| --- | --- | --- |
| Visitors' device MAC address | Audio | Permanent permission to stream audio. |
| | Thermostat | One day permission to modify the thermostat in one bedroom. |

Thus, in this particular example, the visitor 217 has been granted certain access rights with respect to audio type devices and thermostat type devices. The homeowner also may have the option to put time limits on the access rights, e.g., the rights are granted for weekends only or only for 48 hours after grant (or 48 hours after the guest's device is first detected to be within the coverage area of the Smart Space).

As noted above, the system illustrated in FIG. 2 also includes a database, such as in cloud component 213 with which the home gateway 211 can communicate in order to forward to the cloud component 213 or receive from the cloud component access right profiles of users of the home space 201. Thus, for instance, the home gateway 211 may send a message 225 to the cloud component 213 containing all of the access rights profiles, such as the one illustrated in Table 1 above, that have been created or otherwise stored at the home gateway 211. This data may include the identity of the users and/or devices that have been granted access rights in Smart Space 201 and what those access rights are. The cloud component 213 may store that data associated with that Smart Space as well as similar data associated with other Smart Spaces of the same owner/operator.

The owner also has another Smart Space, namely, a car Smart Space 227 that also includes a number of Smart Space devices, such as a modem 231 for enabling communication through the Internet, a hands-free telephone component 233, a display device 235, and an air conditioner 237. The car Smart Space 227 also has its own Smart Space gateway 239, which has its own authorization manager component 241 and may be similar in most relevant respects to the home Smart Space gateway 211.

Assuming that guest device 219 had previously been granted a set of access rights in the home Smart Space 201 and those rights have been communicated to and stored in the database at the cloud component 213, then, when the guest device tries to join the car Smart Space 217 (as represented by message 241 in FIG. 2), the car gateway 239 obtains the MAC address of the device 219 when it tries to join the car Smart Space 227 and sends a message 243 to the cloud component 213 asking if a device with that MAC address has already been granted a set of access rights in any other Smart Spaces owned by the owner. If so, the cloud component 213 sends a message 245 reporting at least a portion of any responsive access right profiles to the car gateway 227. Upon receipt of that data, the authorization manager module 244 of the car gateway 239 may perform an algorithm on the access right profile data received from the cloud component 213 to derive a set of access rights with respect to the Smart Space devices 231, 233, 235, 237 of car Smart Space 227 as a function of the previously granted access rights in the other Smart Space(s). In other embodiments, the cloud component may perform the analysis to derive an access rights profile for the device in the car Smart Space and send it to the car gateway 239. In the latter type of embodiment, the cloud component would also store profiles of the Smart Spaces themselves so that it would know the identities of the Smart Space assets in the various Smart Spaces and the values assigned to them in the various categories.

The algorithm for deriving a set of access rights for a guest device 219 in one Smart Space (e.g., car Smart Space 227) as a function of previously granted set of access rights for that same device (or another device of the same owner) in another Smart Space (e.g., home Smart Space 201) can take almost any form. In a very simple exemplary embodiment, for instance, the guest device 219 may be given the same access rights in the car Smart Space for any given Smart Space device in the car Smart Space having the same device type value and the same or a lower level in the other two categories (criticality level and sensitivity level).

In an embodiment, the owner may indicate to a Smart Space gateway that two or more devices belong to the same person and should be granted the same access rights as each other. This may even be expanded to groups of persons (e.g., devices identified as corresponding to person B should be given the same access rights as devices identified as corresponding to person A or devices of the Smart Space owner's Facebook friends are all granted the same access rights).

Figure 3:
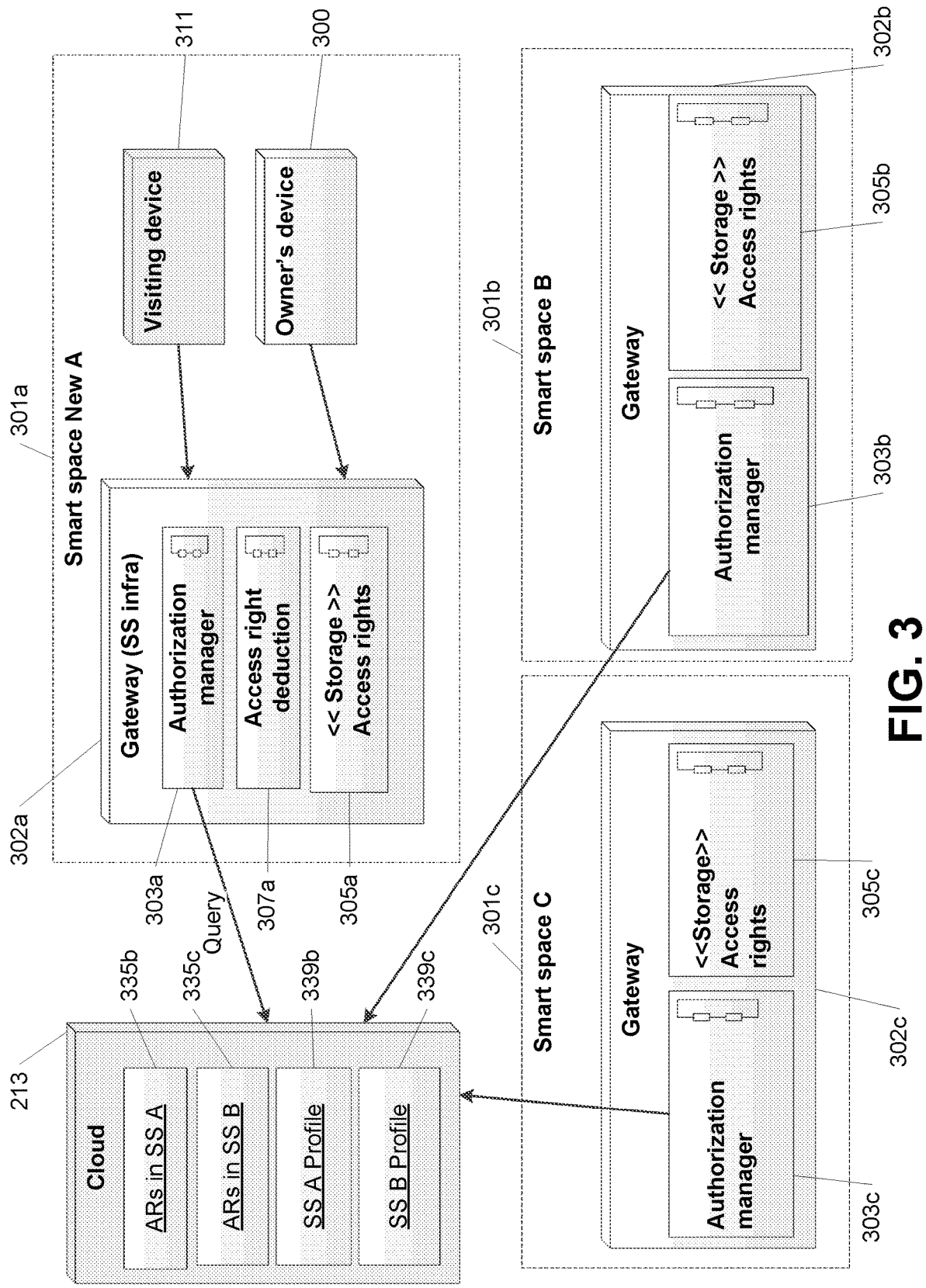
FIG. 3 is more detailed block diagram showing an exemplary embodiment of certain aspects of a system in accordance with the principles disclosed herein.

FIG. 3 is a block diagram providing additional details according to an exemplary embodiment. Particularly, FIG. 3 illustrates three Smart Spaces 301a, 301b, 301c owned and/or operated by the same entity. Each includes one or more Smart Space devices, but they are not shown in FIG. 3 in order not to obfuscate the description. Each Smart Space includes a gateway 302a, 302b, 302c that includes an authorization manager module 303a, 303b, 303c such as previously described in connection with FIG. 2 and a memory 305a, 305b, 305c for storing the access rights, also as previously described. At least one of the gateways 302a also includes an access rights deduction module 307a. The access rights deduction module 307a is the module that deduces access rights for a device and/or user, e.g., visitor's device 311, in a new Smart Space, e.g., 301a, based on the access rights granted to that device/user in the other Smart Spaces, e.g., 301b and/or 301c.

The access right deduction module 307a may take any form, including, but not limited to, software running on a general purpose or dedicated computing device, hardware, or a combination of both.

As previously noted, the cloud component 213, according to one exemplary embodiment, stores access right profiles, such as profiles 335b and 335c that have been previously defined in Smart Spaces 301b and 301c and that have been previously sent to cloud component 213 by Smart Space gateways, such as gateways 303b and 303c. Preferably, these access right profiles include at least the identity of the particular Smart Space to which it corresponds as well as the user device to which it corresponds (e.g., its MAC address) and a definition of the access rights for that particular device in that particular Smart Space, such as illustrated in Table 1.

The cloud component 213 also may store Smart Space profiles for the individual Smart Spaces, such as Smart Space profiles 339b and 339c of Smart Spaces 301b and 301c. These Smart Space profiles may, for instance, indicate the owner of the Smart Space, the type of Smart Space (e.g., home, car, office, factory, public, private, hospital), the kind of authorization protocol that is applicable in the Smart Space (automated and/or manual, and who may grant access rights within that Smart Space). Authorization protocol refers here to how a visitor is initially granted access rights to a Smart Space. For instance, in a home environment, the authorization protocol may have little or no security and may be as simple as the home owner granting access to visitors with a single click. However, in a Smart Space in a more professional environment, a more complex procedure might be applied. For instance, a visitor may be required to show an identification card or undergo a background check prior to being given access rights. Knowledge of the authorization protocol may be used in the algorithm for deducing access rights in another Smart Space as a gauge of how much trust is to be placed on the previously granted access rights in that Smart Space. Table 2 shows an exemplary Smart Space profile.

TABLE 2

| Attribute | Description |
| --- | --- |
| SS owner | Who owns the Smart Space. |
| SS type | E.g., public, private, office, hospital. |
| Authorization mechanism | What kind of authorization scheme is applied in the SS |
| Who has rights to grant ARs? | E.g., owner, owner's spouse, office mates, network administrator. |

As previously mentioned, the Smart Space profile also may disclose the Smart Space assets that are available in that Smart Space and/or the values assigned to those assets in the various categories, e.g., the information shown in the table of FIG. 1, especially in embodiments in which the cloud component determines the Smart Space profiles and sends them to the Smart Space gateways.

Figure 4:
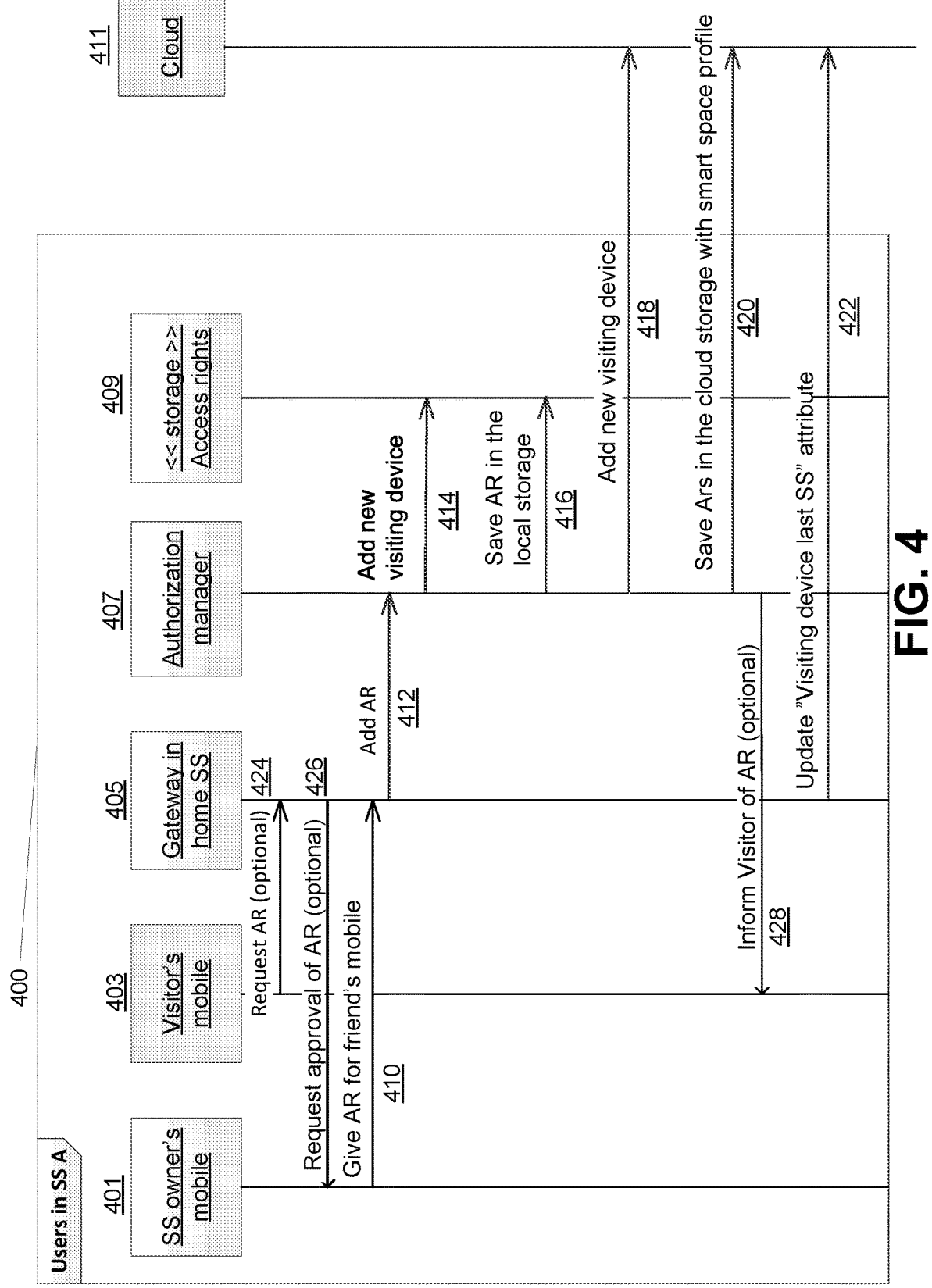
FIG. 4 is a signal flow diagram illustrating an exemplary embodiment of the initial introduction of a guest device into a Smart Space in accordance with the principles disclosed herein.

FIG. 4 is a sequence flow diagram illustrating an exemplary process for manually establishing a set of access rights for a visitor's device in a first Smart Space 400, such as when the visitor does not have any relevant previous access right profiles. In this example, the Smart Space owner uses his mobile device 401 to communicate with the home gateway 405 to define a set of access rights for a friend's mobile device 403 (signal 410). The gateway 405 tells the authorization manager 407 (which may be a component within the gateway 401) to add a corresponding access rights profile (signal 412) as specified by the owner in signal 410.

Alternatively or additionally to the owner proactively sending an access rights profile to the gateway 405, the gateway may detect when a new device, such as the visitor's mobile device 403, is within communication range of the Smart Space 400, attempts to join the Smart Space, or attempts to join the owner home network (all generically represented by signal 424), and send a request to the owner's mobile device 401 seeking instructions as to whether and what access rights to grant to the visitors mobile device 403.

The authorization manager 407 stores the new visiting device ID (e.g., its MAC address) in the access rights storage memory (signal 414) and its access rights profile in the access rights storage memory module 409 (signal 416). The authorization manager also sends the new visiting device ID and its access rights profile to the cloud component 411 for storage at the cloud component (signals 418 and 420).

Optionally, the authorization manager 407 may also send a signal 428 to the visitor's mobile device 403 confirming which access rights it has been granted.

Optionally, whenever the visitor's mobile device joins the Smart Space, the gateway 405 may send to the cloud component a message (signal 422) indicating the same to the cloud component so that the cloud component may store data indicating the last Smart Space (belonging to that particular owner/operator) that the visitor's mobile device visited. Such data may be useful subsequently for security or other purposes.

Although not shown in FIG. 4, thereafter, when the visitor's mobile device 403 comes within communication range of the Smart Space, the gateway 405 may detect its presence, determine its MAC address, check if it has an access rights profile for that MAC address and, if so, permit the visitor's device to access Smart Space assets in that Smart Space according to the defined access rights profile stored in the access rights storage component 409.

Figure 5:
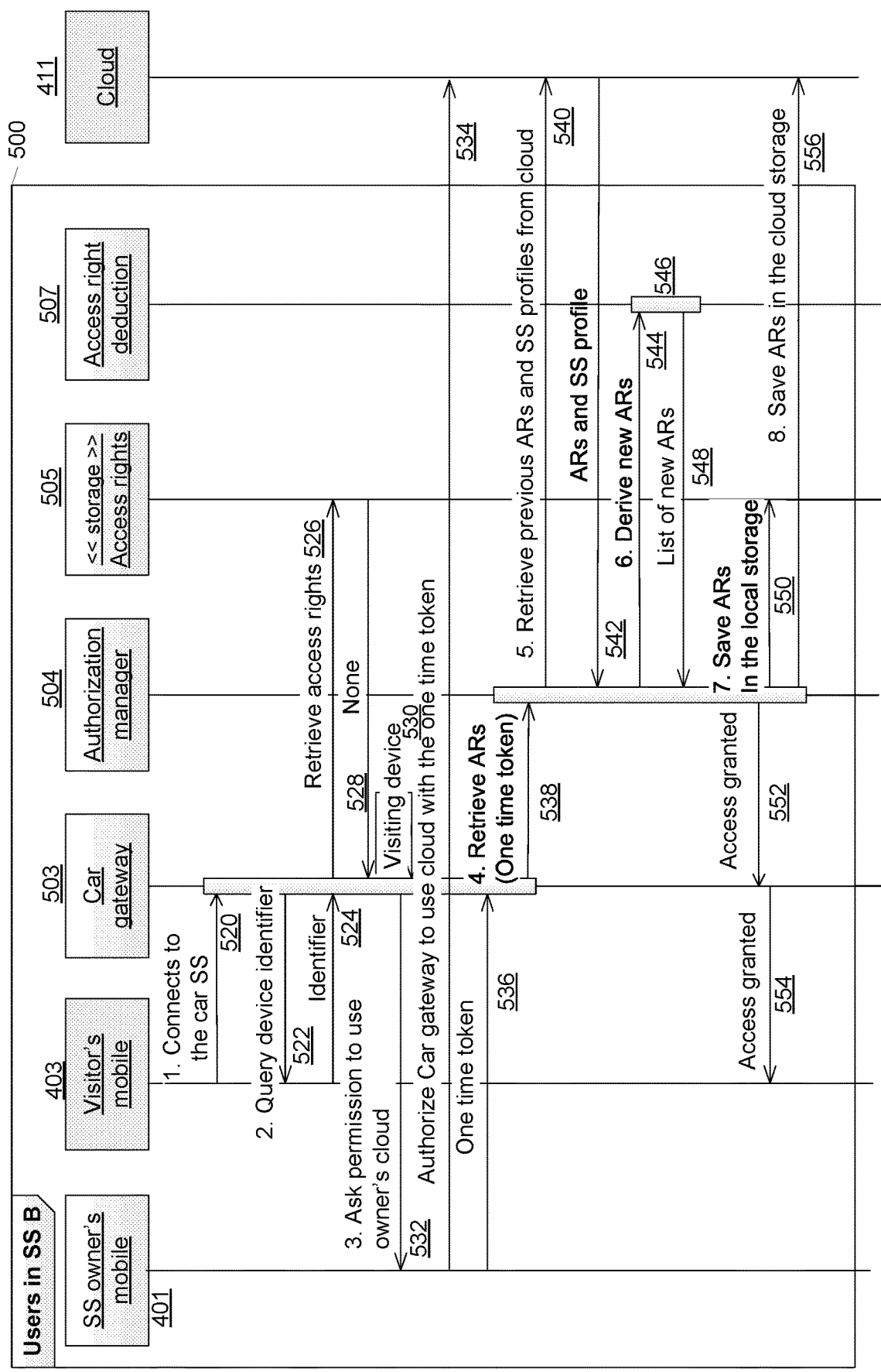
FIG. 5 is a signal flow diagram illustrating an exemplary embodiment of the assigning of access rights for a guest device in a second Smart Space based on access rights previously granted in a first Smart Space in accordance with the principles disclosed herein.

FIG. 5 is a sequence flow diagram illustrating a process according to an exemplary embodiment for automatically granting certain access rights to a user/device (e.g., the visitor from FIG. 4) when that user/device subsequently enters or joins a second Smart Space owned by the same owner as a first Smart Space in which that user has already been granted access rights (e.g., the Smart Space from FIG. 4).

When the visitor's mobile device 403 enters within range of the second Smart Space (e.g., a car Smart Space) 500, it connects to the car Smart Space (signal 520). In response, the car gateway 503 sends a query message (signal 522) to the mobile device 403 to obtain its MAC address (or other device identifying data). The mobile device 403 sends a response 524 with the requested identification data. Initially, the car gateway 503 checks the local access rights storage space 505 to determine if it already has a set of access rights defined for that particular user/device (signal 526). If it does, then it will apply those access rights to the user's device. However, in this example, it is informed that it does not (signal 528). Accordingly, the car gateway 503 determines that this is a new visiting device (530) and sends a query message (signal 532) to the owner's mobile device 500 asking for permission to access the owner's data stored in the cloud component 411.

In response, the owner may interface with and operate his mobile device 401 to grant permission to the car gateway 503 to access the data on the cloud component 411. In one embodiment, this may be implemented by having the owner's mobile device 401 transmit this permission to the cloud component 411 (signal 534) and also send a one-time token to the car gateway 503 (signal 536). The gateway 503 then invokes the authorization manager 504 and provides it with the one-time token (signal 538) so that it can be sent to the cloud component 411 to retrieve any previously granted access rights profiles for the visitor's mobile device that is stored in the cloud component 411. The authorization manager 504 then sends a message (signal 540) to the cloud component 411 including the token and seeking to retrieve any previous access rights profiles and, optionally, Smart Space profiles corresponding to the visitor's mobile device 403. The cloud component 411 responds to the authorization manager 504 with the responsive access rights profiles and, optionally, corresponding Smart Space profiles (signal 542). The authorization manager 504 then sends the retrieved access rights profiles and Smart Space profiles to the access rights deduction module 507 (signal 544).

The access rights deduction module 507 derives a set of access rights for the visitor's mobile device 403 for this Smart Space 500 as a function of the previously granted access rights in other Smart Spaces of the owner (operation 546). As previously mentioned, this may involve comparing the categories, such as group, security level, criticality level, of the various Smart Space devices in the Smart Space(s) in which the visitor's device already has access right profiles to the categories of the Smart Space devices in the new Smart Space 500 and drawing appropriate analogies for deriving a set of access rights for the car Smart Space.

The access rights deduction module 507 then sends the set of access rights for the car Smart Space 500 to the authorization manager 503 (signal 548). The authorization manager 503 writes that set of access rights into a new access rights profile in the local access rights storage space 505 (signal 550). The authorization manager also sends an access granted message (signal 552) to the car gateway 503, which forwards the access granted message to the friend's mobile device 403 (signal 554).

The authorization manager 504 also sends the access rights profile to the cloud component 411 (signal 556). The cloud component stores the new access rights profile (including, e.g., an identification of the particular Smart Space to which it corresponds as well as an identification of the visitor device to which it corresponds) in order to provide even more robust data from which access rights for device 403 may be derived the next time device 403 enters another new Smart Space of the owner.

In some embodiments, steps 532, 534, 536, and 538 may be omitted (i.e., it may be assumed that and/or the owner may have pre-granted the car gateway 503 the right to access the data stored in the cloud component).

In some embodiments (not shown in FIG. 5), the authorization manager 504 may send a message to the owner's mobile device 401 seeking approval of the proposed access rights generated by the access rights deduction module 507 and wait to receive approval of such rights before granting access to the visitor's mobile device 403.

As previously noted, the particular algorithm for deriving new access rights in a new Smart Space as a function of the access rights previously granted in other Smart Spaces are limitless. In a simple embodiment, access rights for the same device groups given in the previous Smart Spaces can be granted in the new Smart Space. For example, if the owner has previously granted a visitor's mobile device access in one Smart Space only to audio components (i.e., Smart Space devices which are tagged as audio devices under the type category in the home Smart Space), then the visitor's mobile device would be granted access rights only to Smart Space devices in the car Smart Space that are tagged as audio devices and those access rights would be the same rights as were granted in the home Smart Space.

In a slightly more complex embodiment, the algorithm may take into account the sensitivity level and criticality level categories of the Smart Space devices. For instance, expanding upon the example given in the immediately preceding paragraph, it may grant the visiting device the same access rights to audio devices in the new Smart Space as were granted in the old Smart Space only in connection with audio devices that have the same or a lower level of criticality and/or sensitivity. In yet another more complex embodiment, the algorithm may also take into account aspects of the Smart Space profile(s) (the new Smart Space profile, the previous Smart Space profile, or both).

Table 4 below shows pseudocode for one exemplary access rights deduction algorithm.

TABLE 4

Figure 6:
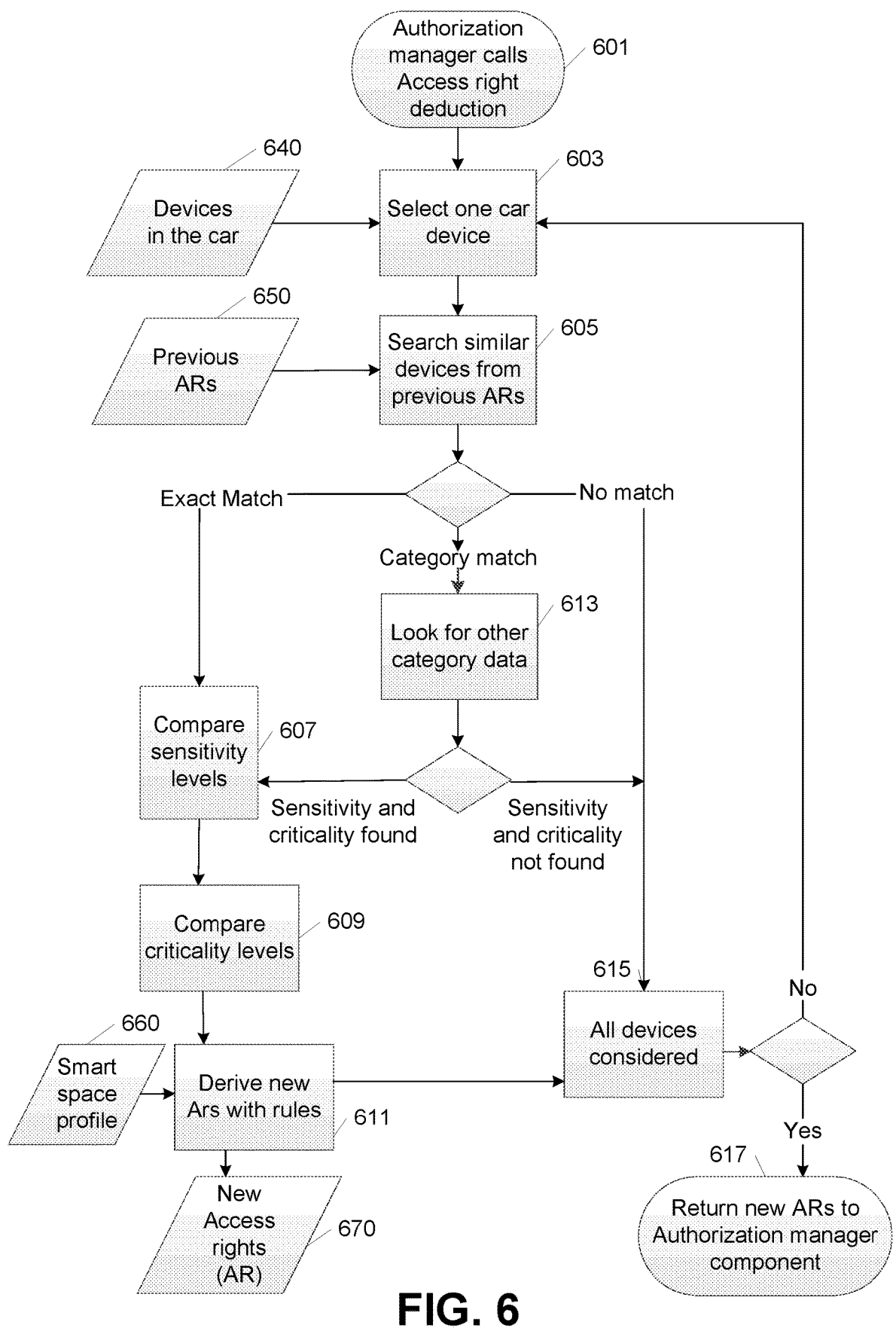
FIG. 6 is a flow diagram illustrating an exemplary algorithm for deriving access rights for a device in one Smart Space based on previously granted access rights in another Smart Space in accordance with principles disclosed herein.

IF
    ((DeviceCategoryInNewSS ==
    DeviceCategoryInPreviousSS)
    AND
    (SensitivityInNewSS ≤ SensitivityInPreviousSS))
THEN
    Grant Access for this visit.
IF
    ((CriticalityInNewSS > CriticalityInPreviousSS)
    OR
    (SensitivityInNewSS > SensitivityInPreviousSS))
THEN
    No Access.
IF
    ((DeviceCategoryInNewSS ==
    DeviceCategoryInPreviousSS)
    AND
    (SmartSpaceProfile_Attribute:
    ARGivenBy == Colleague))
THEN
    Grant Access for DeviceCategory
IF
    ((DeviceInHomeSS == Thermostat AND
DeviceInCarSS == AirCondition)
    AND
    (SmartSpaceProfile_Attribute: FriendType ==
    Facebook friend))
THEN
    Grant Access for AirCondition Device
IF
    ((Device == WiFi)
    AND
    (SensitivityInHome < SensitivityInOffice) AND
    (SensitivityInCar < SensitivityInOffice)
THEN
    No Wifi Access for Office SS
IF
    ((AudioDevice AR granted in home SS)
    AND
    (Sensitivity & Criticality level is OK)
    BUT: Current SS profile restricts audio usage in particular TABLE 4-continued time.
THEN
    No access for Audio at the moment FIG. 6 is a flow diagram illustrating one particular exemplary process for deriving access rights in a new Smart Space based on previously granted access rights in another Smart Space (e.g., operation 546 from FIG. 5 performed by the access rights deduction module 507). The process is initiated at 601 when the authorization manager calls the access rights deduction module. In this particular embodiment, each Smart Space device in the car Smart Space is considered individually. So, in step 603, the access rights deduction module selects one of the Smart Space devices from the set of Smart Space devices 640 in the Smart Space. In step 605, it searches through the previous access rights profiles 650 obtained by the authorization manager from the cloud component. Particularly, it may search for Smart Space devices in those Smart Spaces that match the selected Smart Space device in the new Smart Space with respect to certain criteria (e.g., category, sensitivity, and/or criticality). In this example, it initially looks at the device category, for which there are three possible results from the initial match query performed in step 605. First, there may be an exact match in the device type category. Referring back to FIG. 1, for example, this exact match outcome may be reserved only for exact matches in the device sub-type, such as audio device, thermostat, heart rate monitor, locks. Second, if there is no exact match of device sub-type in the device type category, then there may be a match with respect to the more general device type (e.g., entertainment, home automation, healthcare, security). The third possible result is that neither a sub-type nor general type match was found in the existing access rights profiles.

If there is an exact match, flow proceeds from step 605 to steps 607 and 609, in which the access rights deduction module compares the sensitivity category and criticality category classifications, respectively, of the matching old Smart Space device and the new Smart Space device to determine the similarities and differences.

Flow will then proceed to step 611 in which access rights 670 for the new device in the new Smart Space will be determined.

Merely as an example, if there is an exact match in sensitivity level, criticality level, and Smart Space profile, then the access rights deduction module may grant to the user device the same access rights to the new Smart Space device as were granted to the matching old device. Otherwise no access rights are granted.

In another example, if both the sensitivity and criticality levels of the new device are equal to or lower than the sensitivity and criticality levels of the old device, then the same access rights may be granted to the new device as to the old device. On the other hand, if either the sensitivity level or the criticality level of the new device is higher than the old device, then no access rights to the device in the new Smart Space are granted or more restrictive access rights to the new device may be granted. Otherwise no access rights are granted.

In step 611, in addition to taking into consideration the similarities and differences in the various categories (e.g., device types, sensitivity levels, and criticality levels), the access rights deduction module also may retrieve the Smart Space profile 660 of the old Smart Space(s) (the Smart Space(s) in which the matching device was found) and take into consideration the similarities and differences between the Smart Space profiles of the old and new Smart Spaces. Merely as an example, access rights may be granted to the new device in the new Smart Space only if the Smart Space type of the old Smart Space and the new Smart Space are the same. Otherwise, no access rights will be granted automatically and the owner will be required to manually authorize the guest's mobile device and specify its access rights.

After access rights 670 to the selected device have been deduced, flow proceeds to step 615, in which it is determined if there are any more Smart Space devices in the new Smart Space to be processed. If so, flow proceeds back to step 603 to select another Smart Space device for processing. If not, flow proceeds to step 617, in which the new access rights profile for the user device in the new Smart Space is returned to the authorization manager and the process ends.

Returning to step 605, when there is a match to the general device type, but not the sub-type, flow instead proceeds to step 613. In step 613, the access rights deduction module determines if both the new Smart Space device (that was selected in step 603) and the old Smart Space device (that was determined in step 605) have assigned values in other categories (e.g., sensitivity and criticality). If so, flow proceeds to and through steps 607, 609, 611, and 615 as previously described in connection with an exact match of device category. If, on the other hand, sensitivity and criticality levels have not been assigned to both devices, then no access rights will be automatically derived and flow will instead proceed directly to step 615, where it will determine if there are any more devices in the new Smart Space to check, as previously described.

Returning again to step 605, if neither an exact match nor a general match is found in the device type category, no access rights can be automatically derived and flow will proceed directly from step 605 to step 615, in which it is determined if there are any more Smart Space devices in the new Smart Space to be processed. If so, flow proceeds back to step 603 to select another Smart Space device for processing. If not, flow proceeds to step 617, in which the new access rights profile for the user device in the new Smart Space is returned to the authorization manager and the process ends.

The above described features provide an efficient, automated way to assign access rights to devices/users joining networks when access rights have previously been granted to those devices/users in related networks.

The above described embodiments are merely exemplary and many variations to the specific embodiments discussed hereinabove are possible. For instance, in one alternative embodiment, instead of using a cloud component or cloud storage, the storage, deduction, and maintenance of access rights profiles can be provided in one or more of the network owner's personal computing devices, such as his or her smart phone. Thus, for instance, in one exemplary scenario, a car owner and her friend enter the owner's car. The friend connects her phone to the car Smart Space. The device is unknown to the gateway. The friend's phone sends its MAC address to the car gateway and the gateway forwards that MAC via the Internet, the Smart Space network, and/or any other network means to the owner's smart phone. The owner's smart phone includes an authorization manager, an access rights storage memory, and an access rights deduction module locally. The owner's smart phone then performs the steps substantially as previously described, such as searching for access right profiles previously granted to the friend's smart phone in other Smart Spaces owned by the car owner. The owner's smart phone derives a set of access rights for the friend's smart phone in the car Smart Space and transmits it to the car gateway as well as stores the access rights profile locally for future use. The car gateway also stores the access rights profile and applies it to the friend's smart phone.

In yet another embodiment that eliminates the cloud component, the owner's smart phone may be used to store previously granted access rights profiles (the information stored in the cloud component in the main embodiment), but the car gateway would still include the access rights deduction module (as in the main embodiment). In this embodiment, the car gateway would receive the previously granted access rights profiles from the owner's smart phone and derive a new set of access rights for visiting user devices in the car Smart Space on its own. It would then store that data locally and also send a copy back to the owner's smart phone.

In yet another embodiment, the access rights derivation module functionality and/or cloud component functionality may be resident in one particular Smart Space owned by the network owner (a primary Smart Space, which is not necessarily the Smart Space for which access rights are to be deduced for a user device). In this embodiment, the gateways of the other Smart Spaces owned by the owner may access the access rights deduction functionality and/or previously granted access rights profiles through the Internet, cloud, or any other available network resources.

According to yet another alternative, the access rights deduction module can be used to derive and apply default access rights for Smart Space devices that are newly added to a Smart Space (e.g., a smart appliance or smart television, hereinafter the new Smart Space device) by comparing the device category data (e.g., device type, sensitivity, and/or criticality) to other Smart Space devices already in the same (or a different, commonly owned) Smart Space. If the access rights deduction module determines that the new Smart Space device matches or otherwise meets some criteria of similarity with one or more other Smart Space devices already configured with access rights thereto (hereinafter the old Smart Space device(s)), then it may automatically configure access rights of user (and other) devices to the new Smart Space device as a function of the access rights given to the old Smart Space device. In a simple embodiment, the access rights to the new Smart Space device may be identical to the access rights granted to the old Smart Space device.

Exemplary Network and Devices

The devices, methods, and systems disclosed herein may be implemented in networks and network devices of any variety, including smart phones, Wi-Fi networks, and cellular networks. Described below are examples of some of such devices and networks.

Figure 7A:
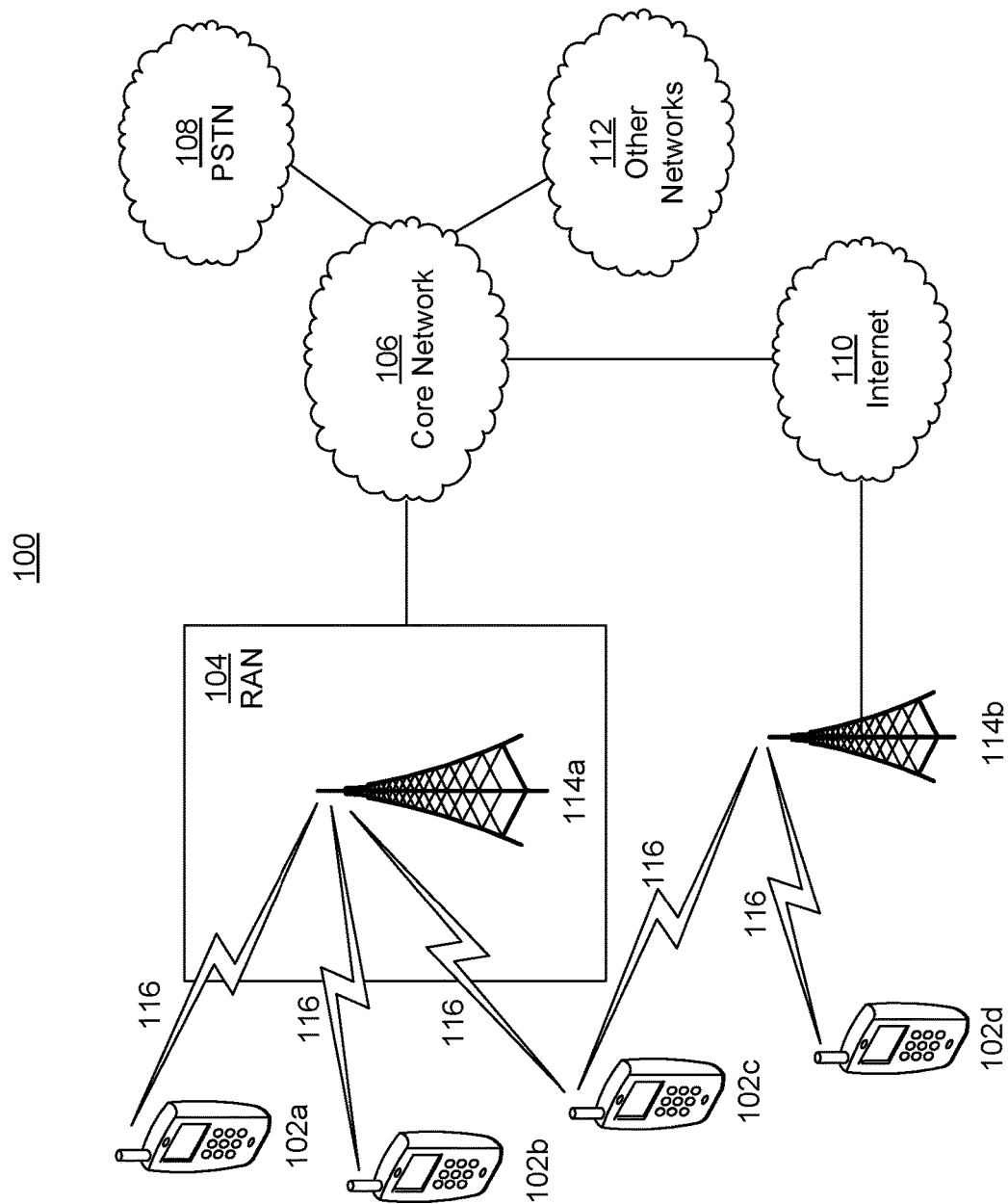
FIG. 7A is a block diagram illustrating an example of a communications system in which one or more disclosed embodiments may be implemented.

FIG. 7A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 7A, the communications system 100 may include wireless transmit/receive units (WTRUs) 102a, 102*b*, 102*c*, 102*d*, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 7A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 7A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 7A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 7A may be configured to communicate with the base station 114*a*, which may employ a cellular-based radio technology, and with the base station 114*b*, which may employ an IEEE 802 radio technology.

Figure 7B:
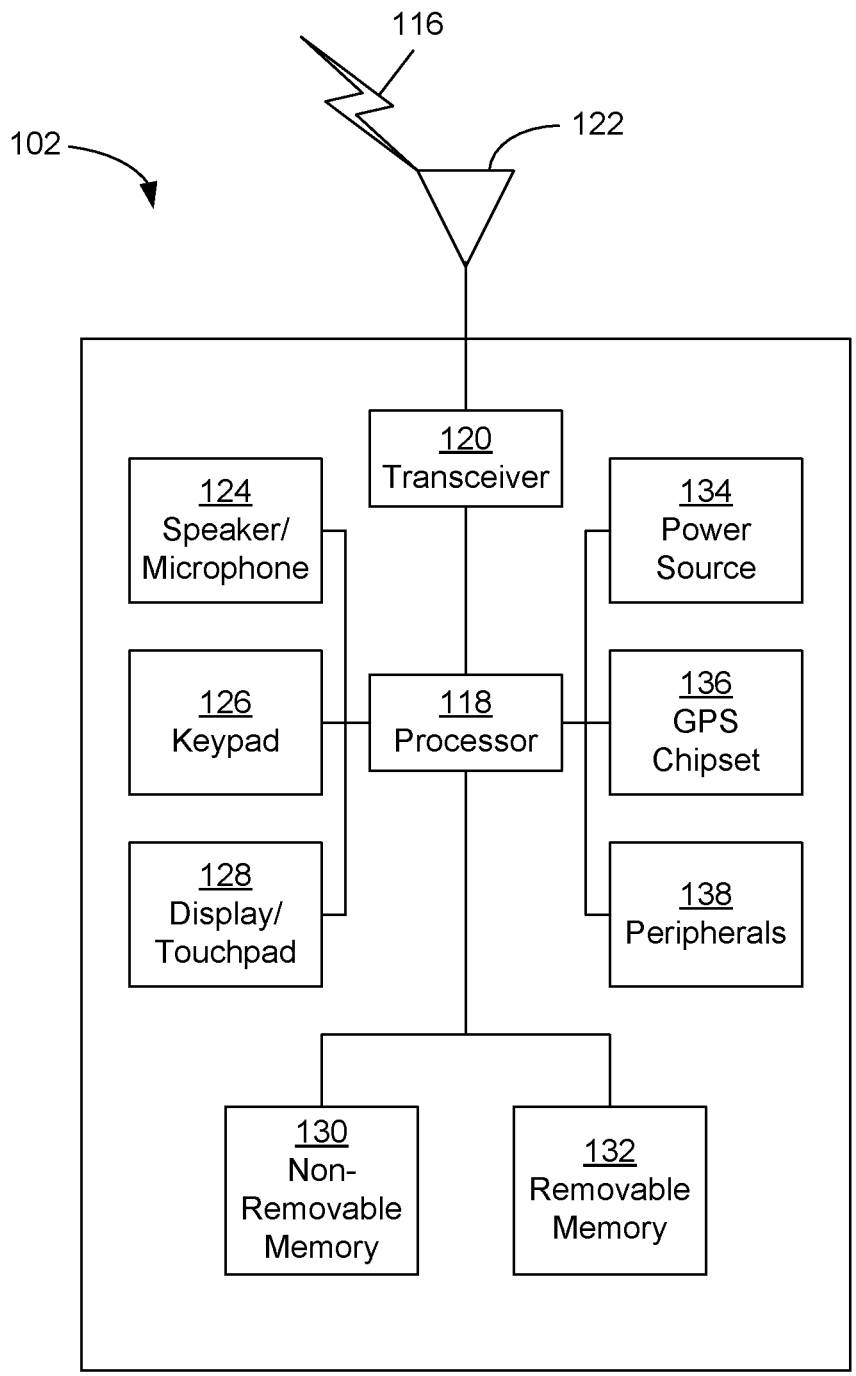
FIG. 7B is a system diagram of an example wireless transmit/receive unit (WTRU) that may be used within the communications system illustrated in FIG. 7A.

FIG. 7B is a system diagram of an example WTRU 102. As shown in FIG. 7B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 7B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 7C:
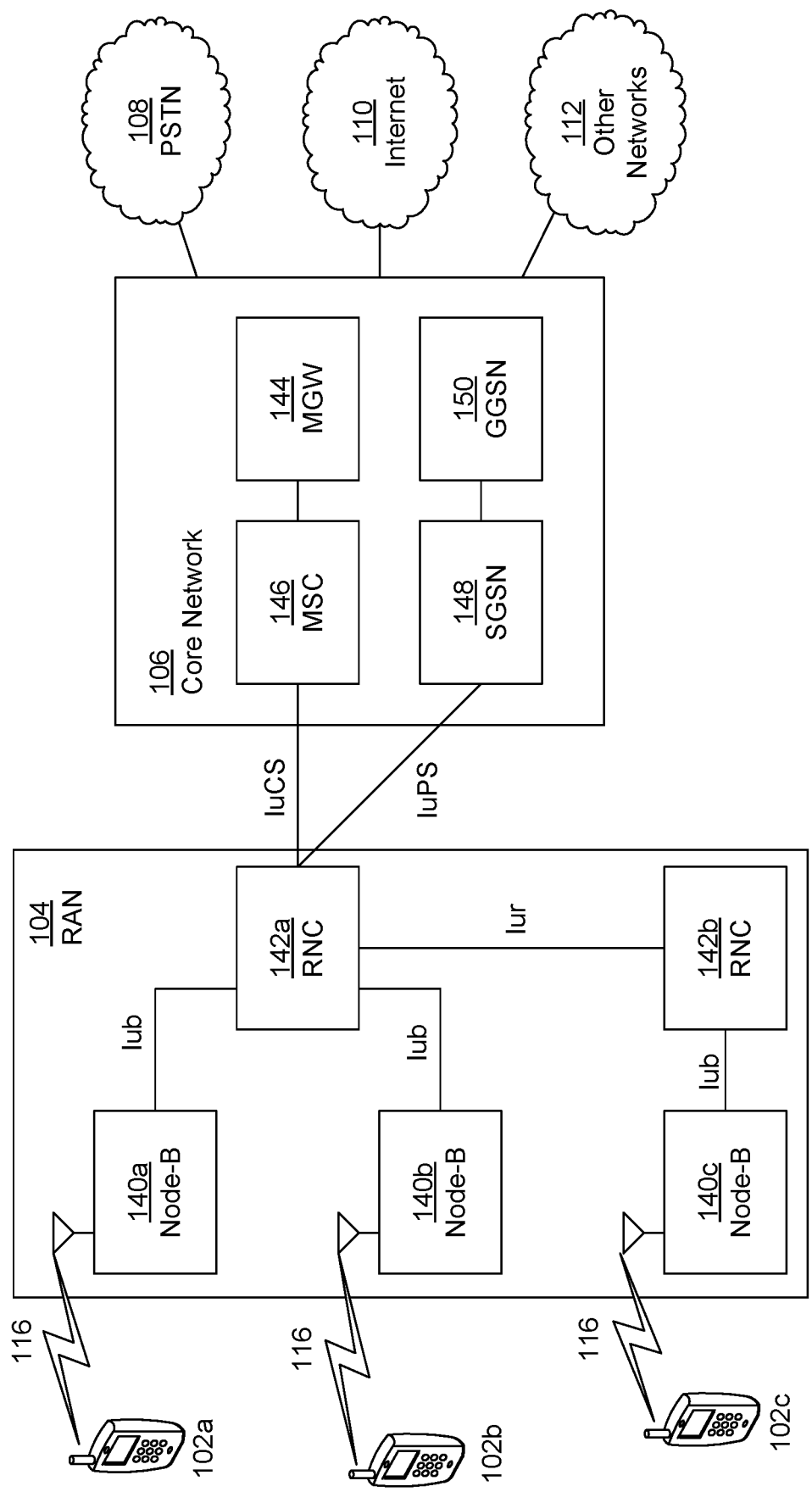
FIGS. 7C, 7D, and 7E are system diagrams of example radio access networks and example core networks that may be used within the communications system illustrated in FIG. 7A.

FIG. 7C is a system diagram of the RAN 104 and the core network 106 according to an embodiment. As noted above, the RAN 104 may employ a UTRA radio technology to communicate with the WTRUs 102*a*, 102*b*, 102*c* over the air interface 116. The RAN 104 may also be in communication with the core network 106. As shown in FIG. 7C, the RAN 104 may include Node-Bs 140*a*, 140*b*, 140*c*, which may each include one or more transceivers for communicating with the WTRUs 102*a*, 102*b*, 102*c* over the air interface 116. The Node-Bs 140*a*, 140*b*, 140*c* may each be associated with a particular cell (not shown) within the RAN 104. The RAN 104 may also include RNCs 142*a*, 142*b*. It will be appreciated that the RAN 104 may include any number of Node-Bs and RNCs while remaining consistent with an embodiment.

As shown in FIG. 7C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 7C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 7D:
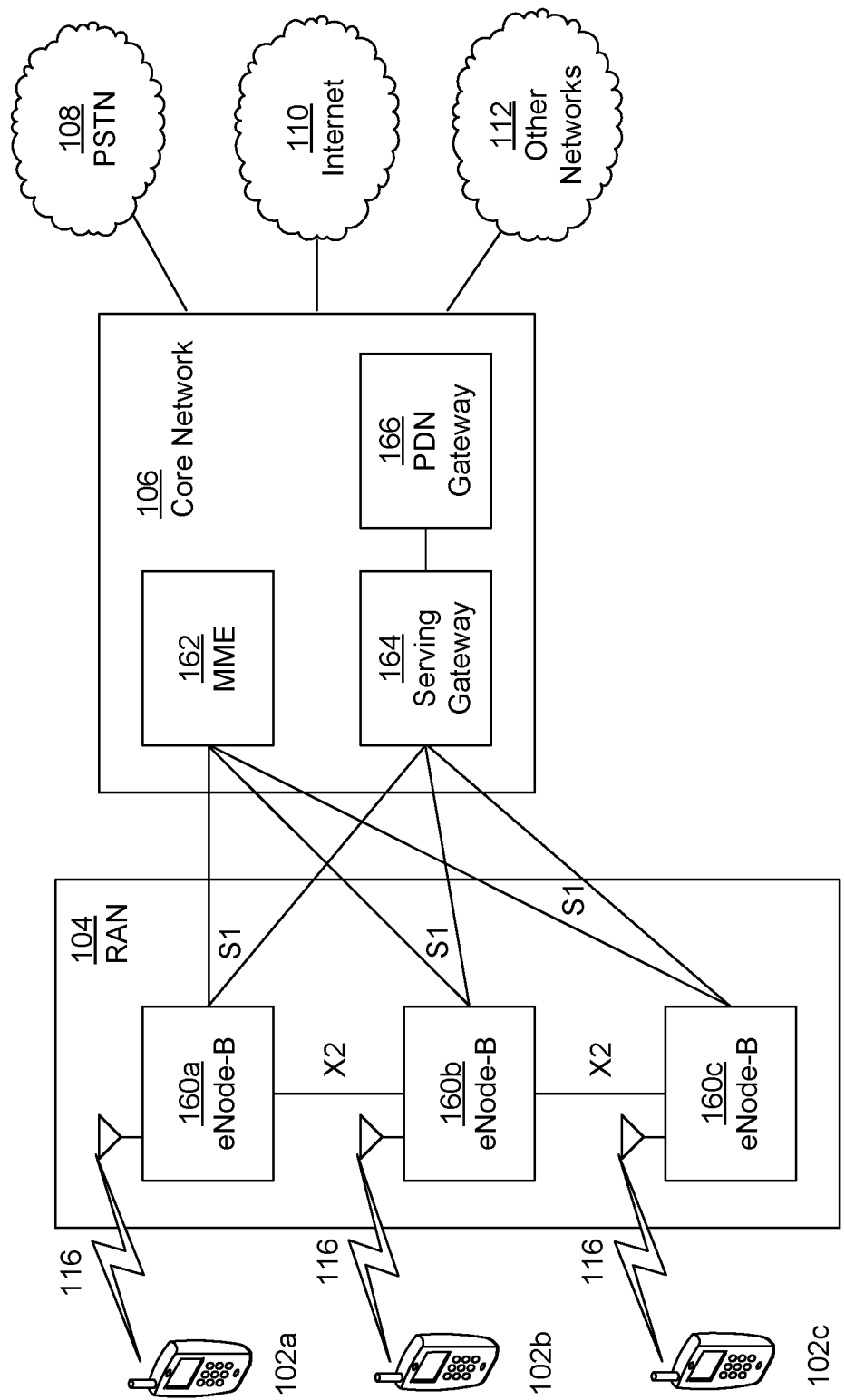

FIG. 7D is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 7D, the eNode-Bs 160a, 160b, 160c may communicate with one another over an X2 interface.

The core network 106 shown in FIG. 7D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 7E:
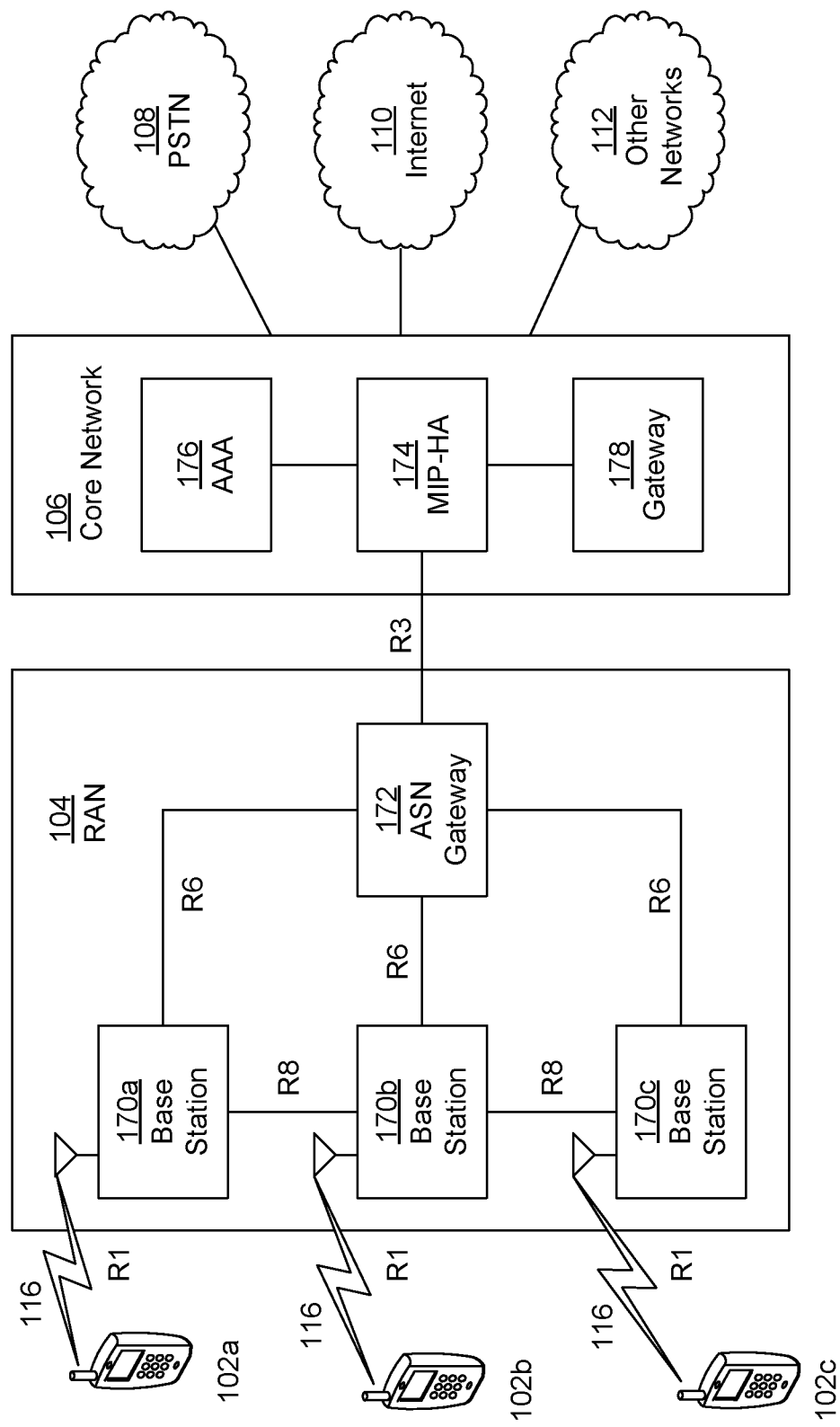

FIG. 7E is a system diagram of the RAN 104 and the core network 106 according to another embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 7E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like.

The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 100c.

As shown in FIG. 7E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 7E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

CONCLUSION

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WRTU), user equipment (UE), terminal, base station, Mobility Management Entity (MME) or Evolved Packet Core (EPC), or any host computer. The WRTU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method comprising:
   obtaining data comprising first access rights applicable to a telecommunication device in a first network;
   based on the first access rights, granting second access rights that authorize the telecommunication device to access a second network; and
   applying the second access rights to the telecommunication device in the second network;
   determining similarities between first assets in the first network and second assets in the second network; and
   when a first set of the first assets is similar to a second set of the second assets, granting, to the telecommunication device, the second access rights to control the second set of the second assets in the second network, which second access rights are similar to the first access rights granted to the telecommunication device to control the first set of the first assets in the first network;
   wherein each of the first and second networks comprises a plurality of assets to which the telecommunication device may be granted access rights, and wherein the first access rights comprise a distinct set of rights applicable to each individual one of the plurality of assets in the first network and the second access rights comprise a distinct set of rights to each individual one of the plurality of assets in the second network.

2. The method of claim 1, wherein the obtaining is performed responsive to the telecommunication device attempting to join the second network.

3. The method of claim 1, further comprising:
   determining an identifier of the telecommunication device;
   wherein the obtaining of the data comprising the first access rights comprises retrieving at least one access rights profile associated with the telecommunication device from a storage device that is external to the second network.

4. The method of claim 1, wherein the first access rights comprise access rights previously granted to at least one first asset in the first network and the second access rights comprise access rights to at least one second asset in the second network.

5. The method of claim 4, wherein the at least one first asset and the at least one second asset each have an assigned value for at least one characteristic of the asset, wherein the method further comprises determining the second access rights based on the first access rights by:
   for each at least one second asset, determining a corresponding asset in the first network having a predetermined degree of similarity to the at least one second asset in terms of the assigned value for the at least one characteristic, and wherein the second access rights are determined based on the first access rights granted to the telecommunication device to the corresponding asset in the first network.

6. The method of claim 4, wherein the at least one first asset in the first network and the at least one second asset in the second network each have an assigned value for a characteristic of the asset, the method further comprising:
   selecting a first asset from a plurality of assets in the first network, wherein the selecting comprises:
   comparing an assigned value for an asset in the first network in at least one category to an assigned value for a second asset in the at least one category;
   determining a degree of similarity between the assigned value for the first asset and the assigned value for the second asset; and
   if the degree of similarity exceeds a threshold, selecting the asset to be the first asset.

7. The method of claim 6, wherein the at least one category comprises a device type.

8. The method of claim 6, wherein the at least one characteristic comprises multiple characteristics and wherein the multiple characteristics comprise at least:
   a device type;
   a criticality characteristic, wherein a value assigned to an asset for the criticality characteristic corresponds to an extent to which an ability to operate the corresponding asset may have a significant effect in the physical world; and a sensitivity characteristic level, wherein a value assigned to an asset for the sensitivity characteristic corresponds to a level of confidentiality of data available through the corresponding asset.

9. The method of claim 1, further comprising obtaining properties of the first network and determining second access rights for the telecommunication device in the second network based on the first access rights by deducing the second access rights based on the properties of the first network.

10. The method of claim 9, wherein the determining comprises determining similarities between the obtained properties of the first network and properties of the second network.

11. A system operating with a first smart space and a second smart space, the system comprising:
a transmitter;
a receiver;
one or more processors; and
at least one memory having stored instructions operative, when executed by the at least one processor, to cause the system to:
detect a telecommunication device attempting to connect to a second smart space;
obtain first access rights previously granted to the telecommunication device in a first smart space;
determine similarities between first assets in the first smart space and second assets in the second smart space;
when a first set of the first assets is similar to a second set of the second assets, grant, to the telecommunication device, the second access rights to control the second set of the second assets in the second smart space, which second access rights are similar to the first access rights granted to the telecommunication device to control the first set of the first assets in the first smart space and authorize access to the second smart space;
wherein each of the first and second smart spaces comprises a plurality of assets to which the telecommunication device may be granted access rights, and wherein the first access rights comprise a distinct set of rights applicable to one of the plurality of assets in the first smart space and the second access rights comprise a distinct set of rights to one of the plurality of assets in the second smart space.

12. The system of claim 11, wherein the processor is further configured to determine an identifier of the telecommunication device and wherein the obtaining of access rights comprises retrieving at least one access rights profile corresponding to the telecommunication device from a storage device that is accessible to at least the first smart space and the second smart space, wherein the at least one access rights profile comprises information about the rights granted to the telecommunication device to assets in the first smart space.

13. The system of claim 11, wherein each of the first and second smart spaces comprises a plurality of assets to which the telecommunication device may be granted access rights, and wherein the first access rights comprise access rights previously granted to a first asset in the first smart space and the second access rights comprise access rights to a second asset in the second smart space.

14. The system of claim 13, wherein the first asset in the first smart space and the second asset in the second smart space have an assigned value for at least one characteristic of the asset, and wherein the one or more processors are further configured to select as the first asset in the first smart space one of the plurality of assets in the first smart space that is assigned a value for the at least one characteristic that meets a threshold of similarity to the value for the characteristic assigned to the second asset in the second smart space.

15. The system of claim 14, wherein the one or more processors are further configured to deduce the access rights for the telecommunication device to the second asset in the second smart space based on the access rights granted to the telecommunication device to the first asset in the first smart space.

16. The system of claim 15, wherein the at least one characteristic comprises multiple characteristics and wherein the multiple characteristics comprise at least:
a device type;
a criticality characteristic, wherein a value assigned to an asset in the criticality characteristic corresponds to an extent to which an ability to operate the corresponding asset may have a significant effect in the physical world; and
a sensitivity characteristic, wherein a value assigned to an asset in the sensitivity characteristic corresponds to a level of confidentiality of data available through the corresponding asset.

17. The system of claim 11, wherein the one or more processors are further configured to obtain properties of the first smart space, and wherein the deducing further comprises deducing the second access rights further based on the properties of the first smart space.

18. The method of claim 1, wherein a first asset of the plurality of assets associated with the second network is configured to control a second asset of the plurality of assets associated with the second network, and wherein the second access rights include access to control at least one of the first asset and the second asset.

19. The method of claim 1, wherein the first network comprises a first plurality of assets interconnected through the first network, wherein the second network comprises a second plurality of assets interconnected through the second network, wherein each of the first plurality of assets and each of the second plurality of assets is an electronic device.

20. A method comprising:
obtaining data comprising first access rights applicable to a telecommunication device in a first network;
selecting a first asset from a plurality of assets in the first network, wherein the selecting comprises:
comparing a value assigned to an asset in the first network in a first category to a value assigned to a second asset of a second network in the first category;
determining a degree of similarity between the value assigned to the first asset and the value assigned to the second asset; and
when the degree of similarity exceeds a threshold, selecting the asset to be the first asset;
based on the first access rights in the first asset, granting second access rights to the second asset, which second access rights authorize the telecommunication device to access the second network; and
applying the second access rights to the telecommunication device in the second network;
wherein each of the first and second networks comprises a plurality of assets to which the telecommunication device may be granted access rights; wherein the first access rights comprise a distinct set of rights applicable to each individual one of the plurality of assets in the first network and the second access rights comprise a distinct set of rights to each individual one of the plurality of assets in the second network; and wherein the first access rights comprise access rights previously granted to at least one first asset in the first network and the second access rights comprise access rights to at least one second asset in the second network.

\* \* \* \* \*